(12) United States Patent
Becker et al.

(10) Patent No.: US 10,811,703 B2
(45) Date of Patent: Oct. 20, 2020

(54) HEAT EXCHANGER AND FUEL CELL SYSTEM

(71) Applicant: Bayerische Motoren Werke Aktiengesellschaft, Munich (DE)

(72) Inventors: Marc Becker, Vaterstetten (DE); Michael Bauer, Unterfoehring (DE); Martin Moser, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 217 days.

(21) Appl. No.: 16/130,283

(22) Filed: Sep. 13, 2018

(65) Prior Publication Data

US 2019/0013530 A1 Jan. 10, 2019

Related U.S. Application Data

(63) Continuation of application No. PCT/EP2017/052764, filed on Feb. 8, 2017.

(30) Foreign Application Priority Data

Mar. 17, 2016 (DE) ........................ 10 2016 204 474

(51) Int. Cl.
*H01M 8/04* (2016.01)
*H01M 8/04007* (2016.01)
(Continued)

(52) U.S. Cl.
CPC ...... *H01M 8/04074* (2013.01); *F28D 7/0066* (2013.01); *F28D 7/1692* (2013.01);
(Continued)

(58) Field of Classification Search
None
See application file for complete search history.

(56) References Cited

U.S. PATENT DOCUMENTS

| 7,910,255 B2 | 3/2011 | Gunther |
| 9,947,946 B2 | 4/2018 | Vanderwees et al. |

(Continued)

FOREIGN PATENT DOCUMENTS

| DE | 10 2004 038 633 A1 | 3/2005 |
| DE | 10 2009 051 476 A1 | 5/2011 |

(Continued)

OTHER PUBLICATIONS

PCT/EP2017/052764, International Search Report dated Mar. 22, 2017 (Three (3) pages).
(Continued)

*Primary Examiner* — Wyatt P McConnell
(74) *Attorney, Agent, or Firm* — Crowell & Moring LLP

(57) ABSTRACT

A heat exchanger for a fuel cell system, in particular in a vehicle, includes a gas section for at least one gas and one cooling fluid section for cooling the at least one gas, a housing, and a cooler matrix which is arranged in the housing and in which the cooling fluid section is configured, where the cooler matrix forms a multiplicity of cavities which produce the gas section, at least one gas inlet on the housing, at least one partition in the cooler matrix for dividing the gas section into at least two flows, with the result that the two flows can be cooled by way of the same cooling fluid section, and at least two gas outlets on the housing, where each flow opens into a dedicated gas outlet.

7 Claims, 5 Drawing Sheets

(51) Int. Cl.
  *F28D 7/00* (2006.01)
  *H01M 8/04119* (2016.01)
  *F28D 7/16* (2006.01)
  *H01M 8/04082* (2016.01)
  *H01M 8/04089* (2016.01)
  *F28F 17/00* (2006.01)
  *H01M 8/04014* (2016.01)
  *H01M 8/1018* (2016.01)
  *H01M 8/04291* (2016.01)
  *F28D 21/00* (2006.01)

(52) U.S. Cl.
  CPC ....... *F28F 17/005* (2013.01); *H01M 8/04014* (2013.01); *H01M 8/04089* (2013.01); *H01M 8/04126* (2013.01); *H01M 8/04141* (2013.01); *H01M 8/04201* (2013.01); *F28D 2021/0043* (2013.01); *H01M 8/04149* (2013.01); *H01M 8/04164* (2013.01); *H01M 8/04291* (2013.01); *H01M 2008/1095* (2013.01); *H01M 2250/20* (2013.01); *Y02T 90/32* (2013.01)

(56) References Cited

U.S. PATENT DOCUMENTS

2005/0284691 A1  12/2005  Voss et al.
2007/0082242 A1   4/2007  Meltser et al.

FOREIGN PATENT DOCUMENTS

| DE | 10 2010 011 556 A1 | 9/2011 |
| DE | 10 2010 041 442 A1 | 3/2012 |
| DE | 20 2013 009 357 U1 | 2/2015 |
| EP | 1 045 215 A2 | 10/2000 |
| WO | WO 2008/019117 A2 | 2/2008 |

OTHER PUBLICATIONS

German Search Report issued in German counterpart application No. 10 2016 204 474.5 dated Nov. 21, 2016, with Statement of Relevancy (Eight (8) pages).

HEAT EXCHANGER AND FUEL CELL SYSTEM

CROSS REFERENCE TO RELATED APPLICATIONS

This application is a continuation of PCT International Application No. PCT/EP2017/052764, filed Feb. 8, 2017, which claims priority under 35 U.S.C. § 119 from German Patent Application No. 10 2016 204 474.5, filed Mar. 17, 2016, the entire disclosures of which are herein expressly incorporated by reference.

BACKGROUND AND SUMMARY OF THE INVENTION

The present application relates to a heat exchanger for a fuel cell system, and to a fuel cell system having the heat exchanger. The heat exchanger and the fuel cell system are used in particular in a vehicle.

Fuel cell systems for mobile applications such as motor vehicles are known from the prior art. In its simplest form, a fuel cell is an electrochemical energy converter which converts fuel and oxidizing agent into reaction products and, in the process, produces electricity and heat. For example, in a fuel cell of the type, hydrogen is used as fuel, and air or oxygen is used as oxidizing agent. The reaction product of the reaction in the fuel cell is for example water. Here, the gases are fed into corresponding diffusion electrodes, which are separated from one another by a solid or liquid electrolyte. The electrolyte transports charged ions between the two electrodes.

The fuel cell comprises an anode and a cathode, which are separated by an ion-selective separator. The anode has a feed for a fuel to the anode. Preferred fuels are: hydrogen, low-molecular-weight alcohol, biofuels, or liquefied natural gas. The cathode has a feed for oxidizing agent. Preferred oxidizing agents are for example air, hydrogen and peroxides. The ion-selective separator may for example be formed as a proton exchange membrane (PEM). A cation-selective polymer electrolyte membrane is preferably used. Materials for such a membrane are for example: Nafion®, Flemion® and Aciplex®.

A fuel cell system comprises at least one fuel cell and peripheral system components (also referred to as BOP components) which may be used during the operation of the at least one fuel cell. In general, multiple fuel cells are combined to form a fuel cell stack.

It is an object of the present invention to specify a heat exchanger for a fuel cell system, which heat exchanger, while having a space-saving construction, permits energy-efficient operation of the fuel cell system.

The object is thus achieved by means of a heat exchanger for a fuel cell system. The fuel cell system is used in particular in a vehicle. In the vehicle, the energy generated by means of the fuel cell system serves in particular for the propulsion of the vehicle.

In the heat exchanger, there is formed a gas path for at least one gas, for example air from the surroundings or exhaust gas from the fuel cell system. The heat exchanger furthermore has a cooling fluid path. The cooling fluid path is used for cooling the at least one gas in the gas path.

The heat exchanger furthermore comprises a housing. A cooler matrix is arranged in the housing. At least a part of the cooling fluid path is formed in the cooler matrix. In particular, the cooler matrix comprises a cooling fluid inlet and a cooling fluid outlet. The corresponding cooling fluid flows in the cooler matrix between the cooling fluid inlet and the cooling fluid outlet. For this purpose, various cooling elements may be provided in the cooler matrix. The cooling elements are for example tubes or plates, wherein the cooling fluid flows in the tubes or between the plates. Furthermore, the cooling elements may also be formed by thin cooling ribs or sheets in which no cooling fluid flows but which are continuously cooled by the cooling fluid.

The cooler matrix forms a multiplicity of cavities. The cavities are situated in particular between the individual cooling elements of the cooler matrix. The entirety of the cavities constitutes the gas path. The at least one gas, that is to say the air or the exhaust gas, which flows through the gas path and thus through the cavities of the cooler matrix is cooled by the cooler matrix.

To introduce the gas for cooling into the housing and thus into the gas path within the cooler matrix, at least one gas inlet is provided on the housing.

According to the invention, at least one partition is situated in the cooler matrix. The partition divides the gas path within the cooler matrix into at least two channels. Owing to the arrangement of the partition within the cooler matrix, the gases in the at least two channels are cooled by means of the same cooler matrix and thus the same cooling fluid path. The cooling of the gases in the at least two channels is thus performed not only in the same cooler matrix but also in the same housing. According to the invention, at least two channels can be cooled with only one heat exchanger and only one cooling fluid path.

Furthermore, at least two gas outlets are situated on the housing, wherein each channel opens into a dedicated gas outlet. By means of the two separate gas outlets, no mixing of the at least two gas flows occurs.

The gas entering at the gas inlet can be divided up between at least two channels. For this purpose, at least one guide element or a corresponding partition wall is advantageously situated in a prechamber within the housing in order to distribute the incoming gas between the channels.

In addition or alternatively, it is also possible for two or more gas inlets to be formed on the housing. In this way, it is possible for multiple different gas flows, for example the air conveyed to a fuel cell and the exhaust gas discharged from the fuel cell, to be cooled in two channels of the cooler matrix.

Provision is preferably made for the at least one partition to extend through and/or across several of the cavities of the cooler matrix. To realize the very compact and inexpensive construction of the heat exchanger, provision is in particular not made for two separate cooler matrices to be connected by means of corresponding connecting channels for the cooling fluid. Rather, the common cooler matrix is divided into the channels by the at least one partition.

The partition is preferably a separate component which is inserted into the cooler matrix. In addition or alternatively, provision is preferably made for the individual cooling elements within the cooler matrix to be designed and shaped such that the partition and thus at least two mutually separate channels are realized.

Furthermore, provision is preferably made for the at least two channels to extend over the entire length of the gas path and thus over the entire length of the cooler matrix, and to be separated from one another over the entire length.

The separation of the channels by the partition is in particular configured such that no mixing of the gases from the two channels occurs within the cooler matrix. For this purpose, provision is particularly preferably made for the at least one partition to separate the channels from one another in gas-tight fashion.

The invention furthermore comprises a fuel cell system. The fuel cell system has at least one fuel cell. The fuel cell system involves in particular a stack of multiple fuel cells. Furthermore, the fuel cell system comprises a compressor and an air path that leads from the compressor to the cathode side of the fuel cell. By means of the compressor, ambient air is compressed and conducted via the air path into the fuel cell.

The fuel cell system according to the invention furthermore comprises a heat exchanger as has been described above. The heat exchanger is arranged in the air path. Correspondingly, a compressor outlet is connected to the at least one gas inlet on the housing of the heat exchanger. The gas inlet is accordingly referred to as air inlet.

A fuel cell air channel is partitioned off in the cooler matrix. The fuel cell air channel is partitioned off from at least one further channel by means of the described partition. The "at least one further channel" may, depending on the embodiment, be a compressor cooling air channel or an exhaust gas channel. These different variants will be described in more detail.

The fuel cell air channel opens into a dedicated gas outlet, which is referred to here as fuel cell air outlet. The fuel cell air outlet is in turn connected to the at least one fuel cell, such that the air cooled in the fuel cell air channel can be fed to the cathode side of the fuel cell.

The heat exchanger used in the fuel cell system is thus a charge-air cooler, wherein, owing to the partitioning-off of the fuel cell air channel, a further gas flow can be cooled within the same heat exchanger, within the same cooler matrix and by means of the same cooling fluid path.

The compressor is preferably of a structural form that must be cooled using air, and/or has an air bearing arrangement that must be supplied with and cooled by means of compressed air. The compressor is thus also referred to as an air-bearing-type radial compressor.

In a preferred embodiment, provision is made for the cooler matrix to have a compressor cooling air channel in addition to the fuel cell air channel.

A prechamber is advantageously formed on the housing for this purpose. A guide element is situated in the prechamber. The air flowing in from the compressor via the air inlet is divided up between the two channels, specifically the fuel cell air channel and the compressor cooling air channel, by means of the guide element in the prechamber. An end piece of the housing is formed on the other side of the cooler matrix. Two gas outlets, specifically the fuel cell air outlet and a compressor cooling air outlet, are formed on the end piece.

The compressor cooling air outlet leads via a compressor cooling air return line into the compressor in order to cool the compressor and/or supply compressed air to the air bearing arrangement.

A nozzle for injecting water into or upstream of the fuel cell air channel is particularly preferably situated in the housing of the heat exchanger. As described, the housing preferably has a prechamber. A guide element is situated in the prechamber. The nozzle for injecting the water is particularly preferably situated on that side of the guide element which leads into the fuel cell air channel. In this way, the water can be injected into the air stream that leads to the fuel cell. Here, the air recirculated to the compressor remains dry.

The injection of the water is thus performed upstream of the cooler matrix or at the start of the channel. In this way, it can be ensured that the required evaporation enthalpy can be supplied, and no liquid water reaches the cathode of the fuel cell. However, humidified air must not be used for cooling the compressor rotor or the compressor bearing, because this would lead to damage to the compressor. In the prior art, a separate heat exchanger is therefore used to provide the cooling air for the compressor. In the context of the invention, it is however possible for one and the same heat exchanger to cool both the air for the fuel cell and the recirculated air to the compressor.

The fuel cell system preferably comprises an exhaust gas path. The exhaust gas path leads from the fuel cell into the surroundings. An exhaust gas channel is partitioned off in the cooler matrix. The exhaust gas path runs through the exhaust gas channel. In addition to the exhaust gas channel, the cooler matrix has the fuel cell air channel.

The above-described compressor cooling air channel may be partitioned off as a preferred third channel within the cooler matrix.

The fuel cell air channel particularly preferably runs in the opposite direction to the exhaust gas channel. Accordingly, the air inlet is situated on one side of the housing, and the corresponding exhaust gas inlet is situated on the other side of the housing.

The compressor cooling air channel runs preferably in the same direction as the fuel cell air channel. Accordingly, both the exhaust gas inlet and the compressor cooling air outlet and the fuel cell air outlet are situated on one side of the housing.

The at least one partition in the cooler matrix is preferably arranged such that the two channels, preferably all three channels, run parallel to one another.

The exhaust gas emerging from the fuel cell is relatively humid and is cooled in the cooler matrix, such that a part of the water in the exhaust gas condenses. The liquid water from the exhaust gas is preferably captured in the heat exchanger or downstream of the heat exchanger in a water collecting vessel. For this purpose, a water separator is provided in particular within the heat exchanger or downstream of the heat exchanger.

In this preferred embodiment, the heat exchanger thus serves not only as a charge-air cooler but simultaneously also as a condenser for the exhaust gas, and advantageously also for the cooling of the air recirculated to the compressor.

In the prior art, a dedicated condenser is used in the exhaust-air path. The condensation enthalpy of water of approximately 2500 kJ/kg leads in this case to a very large transfer of heat into the cooling fluid. If, as in the prior art, the condenser is connected into a separate circuit, considerable outlay is required in order to ensure the water condensation in all operating states. This is realized here for example by means of a dedicated cooling circuit with a radiator. The heat exchanger according to the invention leads here to a very much simpler construction, because the same cooler matrix and the same cooling fluid path are also used for the condensation of the water from the exhaust gas.

In operating states in which water is injected via the nozzle, heat for evaporating the water is required in the fuel cell air channel. This leads to a lowering of the temperature of the cooling fluid. At the same time, here, in the exhaust gas channel, during the condensation of the water, heat is released to the cooling fluid. This gives rise to a relatively heat-neutral solution, in the case of which the water injection requires no additional outlay in the coolant system.

As already described, water can be injected by means of the nozzle into the air fed to the fuel cell. The water condensed out of the exhaust gas is advantageously used for this purpose.

An alternative refinement provides that the cooler matrix is divided only into the fuel cell air channel and the compressor cooling air channel. A membrane humidifier is provided downstream of the cooler matrix. The exhaust gas path leads through the membrane humidifier. By means of a membrane within the membrane humidifier, the cooled air fed to the fuel cell is humidified by means of the exhaust gas.

In a preferred refinement, the membrane humidifier is integrated into the housing of the heat exchanger. For this purpose, provision is made in particular for the housing to have a central piece in which the cooler matrix is arranged. The membrane humidifier is mounted directly on the central piece, such that no additional lines, hoses or pipes are required for conducting the air out of the cooler matrix into the membrane humidifier.

In a preferred embodiment, an intermediate piece is inserted between the central piece of the housing and the membrane humidifier. The air emerging from the compressor cooling air channel collects in the intermediate piece.

Accordingly, the compressor cooling air outlet is also formed on the intermediate piece.

Other objects, advantages and novel features of the present invention will become apparent from the following detailed description of one or more preferred embodiments when considered in conjunction with the accompanying drawings.

DETAILED DESCRIPTION OF THE DRAWINGS

FIGS. 1 to 5 show, in different exemplary embodiments and in schematic views, a heat exchanger 2 in a fuel cell system 1. In each case only those components of the fuel cell system 1 that are necessary for explaining the invention are shown. The fuel cell system 1 is used in particular in a vehicle.

In all of the exemplary embodiments, identical or functionally identical components are denoted by the same reference designations.

Figure 1:
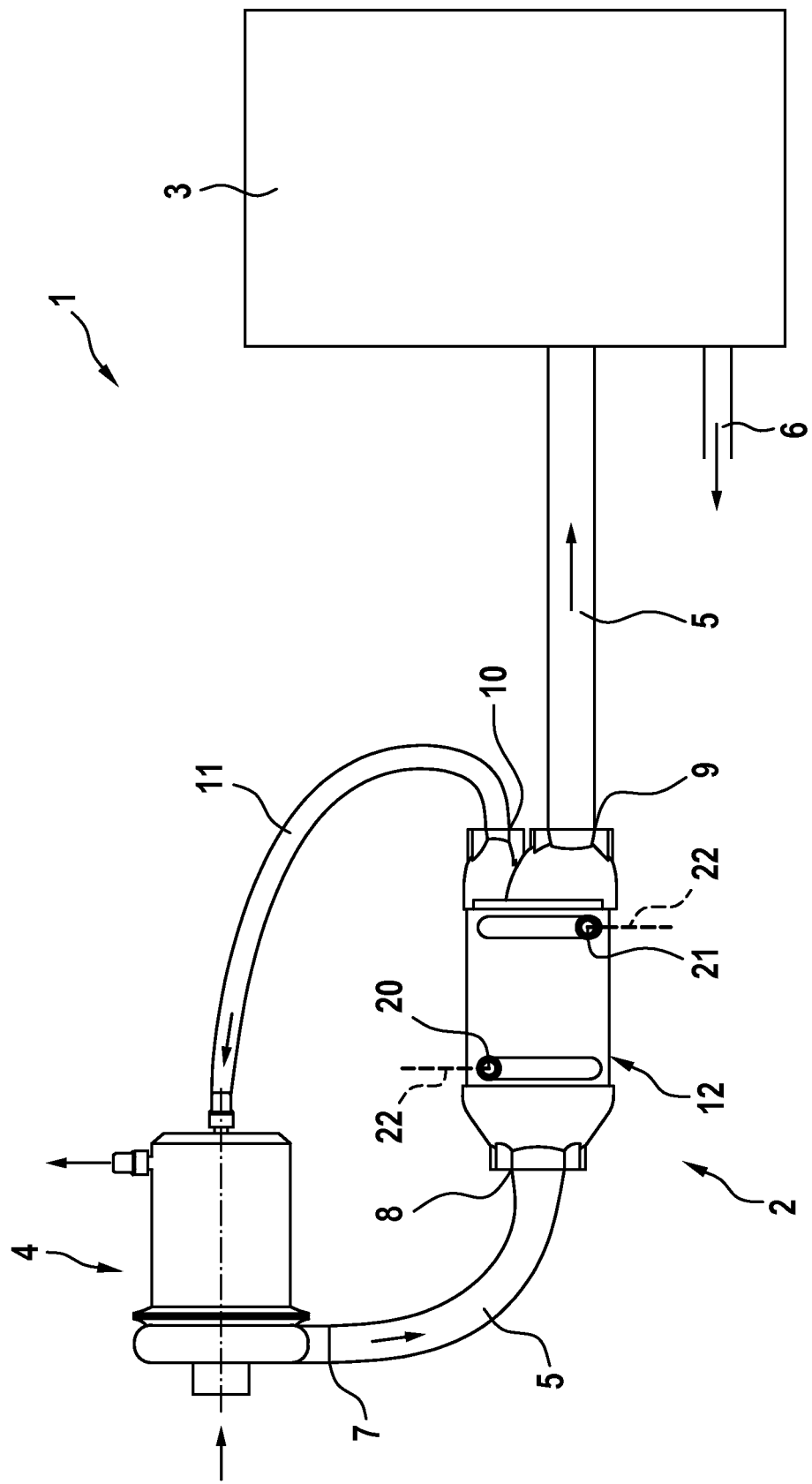
FIG. 1 shows a fuel cell system according to the invention having a heat exchanger according to the invention as per a first exemplary embodiment.

FIG. 1 shows the fuel cell system 1 according to the first exemplary embodiment. The fuel cell system 1 comprises at least one fuel cell 3. In particular, several of the fuel cells 3 are arranged in a stack. The fuel cell system 1 furthermore comprises a compressor 4, the heat exchanger 2, an air path 5 and a compressor cooling air return line 11.

The compressor 4 draws in ambient air axially and discharges the compressed air via a compressor outlet 7. Furthermore, the compressor 4 has a corresponding inlet and outlet for the compressor cooling air return line 11.

The heat exchanger 2 comprises a housing 12. An air inlet 8 (referred to generally as gas inlet) is formed on the housing 12. A fuel cell air outlet 9 and a compressor cooling air outlet 10 (referred to generally as gas outlets) are situated on the opposite side of the housing 12.

Furthermore, a cooling fluid inlet 20 and a cooling fluid outlet 21 are formed on the housing 12. A corresponding cooling fluid flows via the cooling fluid inlet 20 into the heat exchanger 2 and exits the heat exchanger 2 via the cooling fluid outlet 21. Thus, a cooling fluid path 22 of the heat exchanger 2 runs via the cooling fluid inlet 20 and the cooling fluid outlet 21.

The air path 5 of the fuel cell system 1 leads from the compressor outlet 7 to the air inlet 8 of the heat exchanger 2, through the heat exchanger 2 and from the fuel cell air outlet 9 to the cathode side of the fuel cell 3.

The compressor cooling air return line 11 leads from the compressor cooling air outlet 10 back to the compressor 4.

An exhaust gas path 6 leads from the fuel cell 3 into the surroundings.

Figure 2:
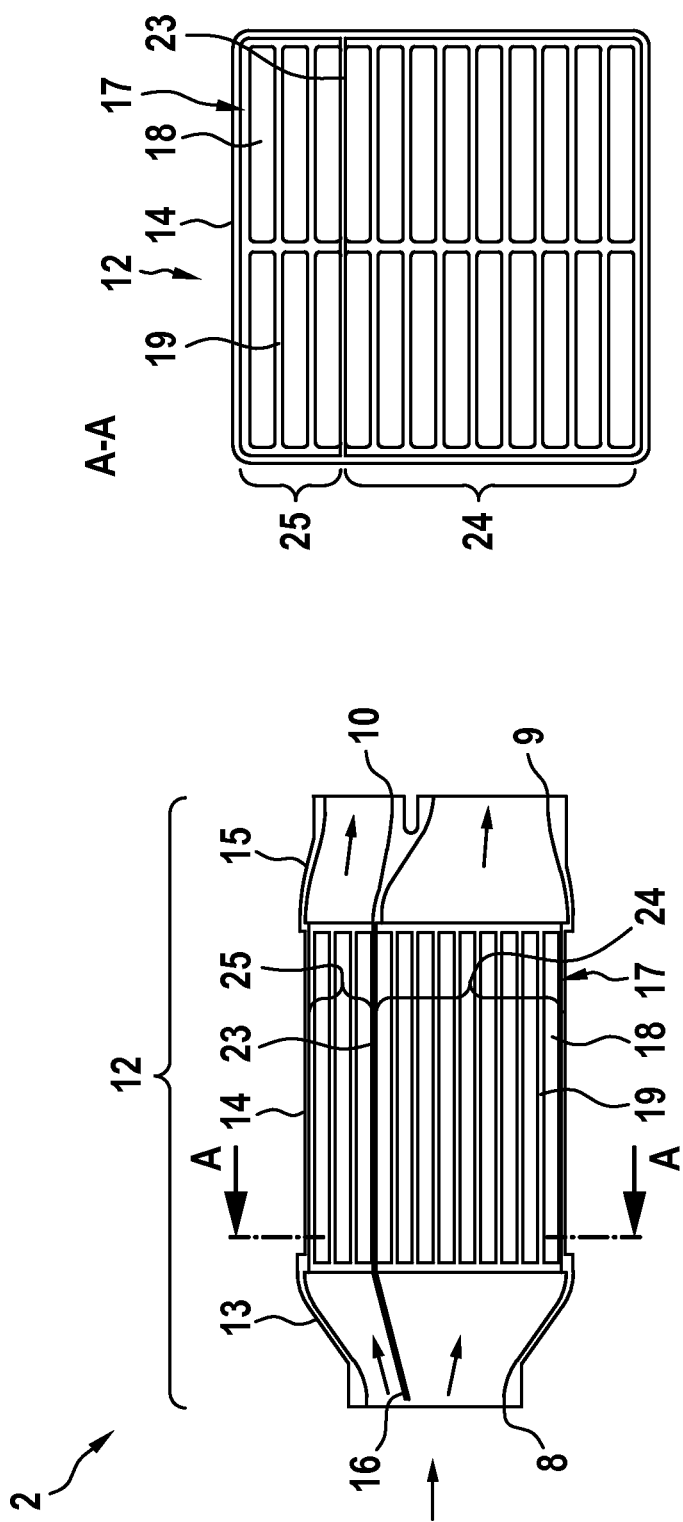
FIG. 2 shows two views of the heat exchanger according to the invention as per the first exemplary embodiment.

FIG. 2 shows, in two different illustrations, the construction of the heat exchanger 2 in detail. The left-hand illustration in FIG. 2 shows a longitudinal section through the heat exchanger 2. The right-hand illustration in FIG. 2 shows the section A:A indicated on the left-hand illustration.

The housing 12 of the heat exchanger 2 comprises a prechamber 13 and an end piece 15. A central piece 14 of the housing 12 is arranged between the prechamber 13 and the end piece 15.

A cooler matrix 17 of the heat exchanger 2 is positioned in the central piece 14 of the housing 12. The cooler matrix 17 is connected in fluid-conducting fashion to the cooling fluid inlet 20 and to the cooling fluid outlet 21. The cooler matrix 17 thus forms the cooling fluid path 22 between cooling fluid inlet 20 and cooling fluid outlet 21.

Various cooling elements 18 may be provided in the cooler matrix 17. The cooling elements 18 are for example tubes or plates, wherein the cooling fluid flows in the tubes or between the plates. Furthermore, the cooling elements may also be formed by thin cooling ribs or sheets in which no cooling fluid flows but which are continuously cooled by the cooling fluid.

The cooler matrix 17 forms a multiplicity of cavities 19. The cavities 19 are situated in particular between the individual cooling elements 18 of the cooler matrix 17. The entirety of the cavities 19 constitutes the gas path. The gas in the gas path is cooled by the cooler matrix 17.

In the two sectional illustrations in FIG. 2, the cooler matrix 17 is divided by a partition 23 into two channels. These are a fuel cell air channel 24 and a compressor cooling air channel 25. The partition 23 extends over the entire length and width of the cooler matrix 17. The two channels 24, 25 are thus entirely separated from one another.

The air compressed by the compressor 4 flows into the prechamber 13 of the housing 12. A guide element 16 is arranged in the prechamber 13. By means of the guide element 16, the inflowing air is divided up between the fuel cell air channel 24 and the compressor cooling air channel 25.

Within the cooler matrix 17, the air is cooled in both channels 24, 25 simultaneously by means of the same cooler matrix 17, by means of the same cooling fluid path 22 and thus by means of the same cooling fluid.

In the end piece 18 of the housing 12, the fuel cell air outlet 9 and the compressor cooling air outlet 10 are formed separately from one another. It is thereby ensured that the air from the fuel cell air channel 24 flows only into the fuel cell air outlet 9, and the air from the compressor cooling air channel 25 flows only into the compressor cooling air outlet 10.

As shown in the section A:A in FIG. 2, the entire cross-sectional area of the cooler matrix 17 is maintained and is divided only by the at least one partition 23. In particular, provision is made here for the cross-section of the cooler matrix 17 to not be narrowed or constricted for the purposes of the division into the individual channels. Rather, the conventional cross-sectional shape, for example the rectangular, circular or oval shape, of a conventional cooler matrix is maintained and is merely divided into channels by the at least one partition 23.

Figure 3:
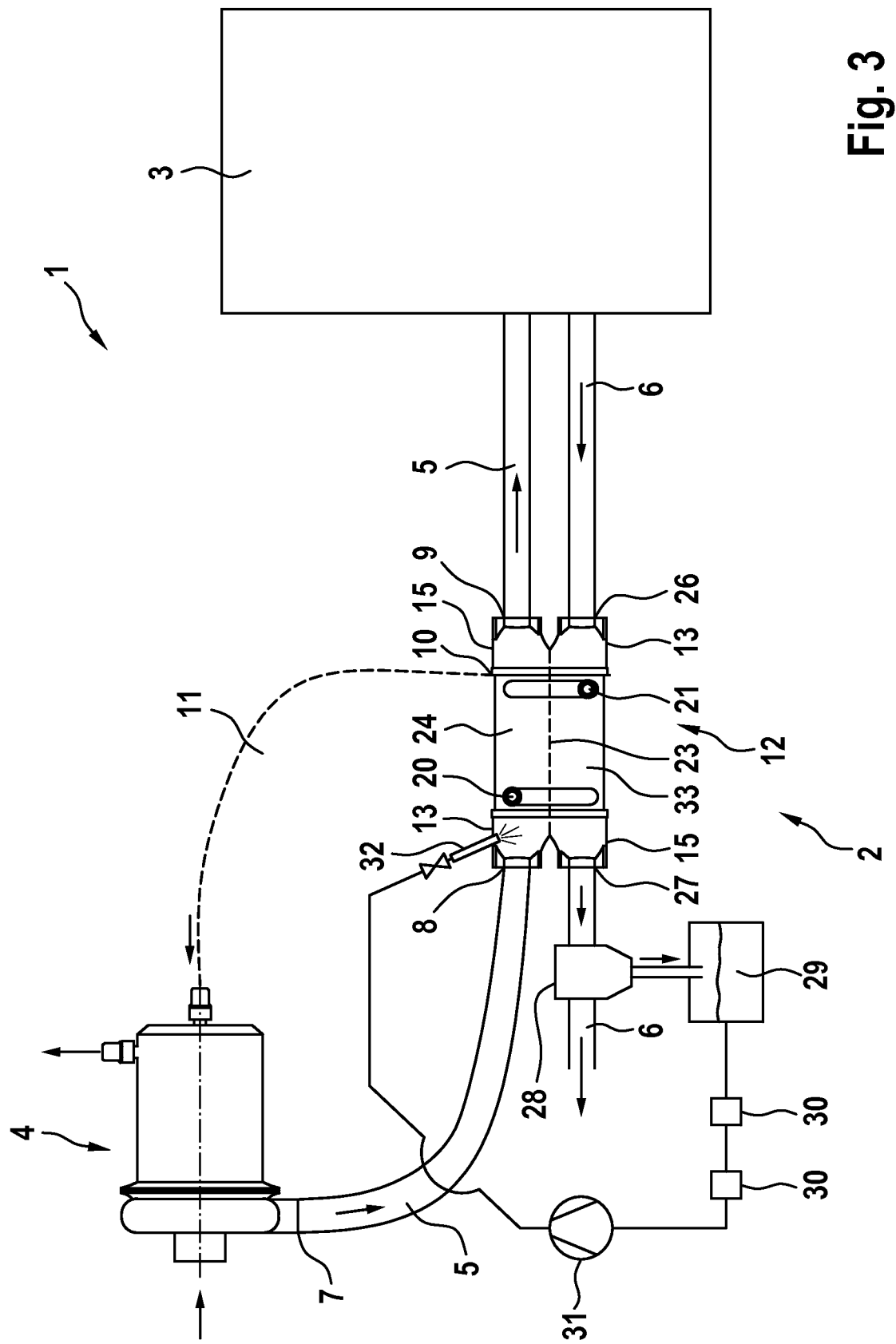
FIG. 3 shows the fuel cell system according to the invention having the heat exchanger according to the invention as per a second exemplary embodiment.

FIG. 3 shows the fuel cell system 1 as per the second exemplary embodiment. In the second exemplary embodiment, the cooler matrix 17 has at least two channels: the fuel cell air channel 24 and an exhaust gas channel 33.

In the second exemplary embodiment, in addition to these two channels 24, 33, the compressor cooling air channel 25 may also be partitioned off, as has been discussed in the context of the first exemplary embodiment. In the context of the second exemplary embodiment, however, in particular the possibility of utilizing the heat exchanger 2 for the condensation of water in the exhaust gas path 6 will be presented.

In the second exemplary embodiment, the exhaust gas path 6 runs through the exhaust gas channel 33 of the heat exchanger 2. For this purpose, the housing 12 of the heat exchanger 2 comprises an exhaust gas inlet 26 and an exhaust gas outlet 27.

In the exemplary embodiment shown, the fuel cell air channel 24 and the exhaust gas channel 33 run in opposite directions. The two gas flows, specifically the air and the exhaust gas, are strictly separated from one another. Therefore, the exhaust gas inlet 26 is separated from the fuel cell air outlet 9. The exhaust gas outlet 27 is separated from the air inlet 8. Nevertheless, the air inlet 8 can be integrated together with the exhaust gas outlet 27, and/or the fuel cell air outlet 9 can be integrated together with the exhaust gas inlet 26, in one housing component.

Downstream of the heat exchanger 2, the exhaust gas path 6 passes through a water separator 28. The water separated off therein is collected in a water collecting vessel 29.

From the water vessel 29, a water line leads to a nozzle 32. A pump 31 and/or at least one filter 30 are advantageously situated in the water line.

The nozzle 32 is situated in the prechamber 13 and is arranged such that the water is injected only into or upstream of the fuel cell air channel 24.

In the case of the water injection being combined with the separate formation of the compressor cooling air channel 25 within the cooler matrix 17, as shown in FIG. 2, the nozzle 32 would be arranged below the guide element 16. It is achieved in this way that the water is injected only into or upstream of the fuel cell air channel 24, and not into the compressor cooling air channel 25.

Figure 4:
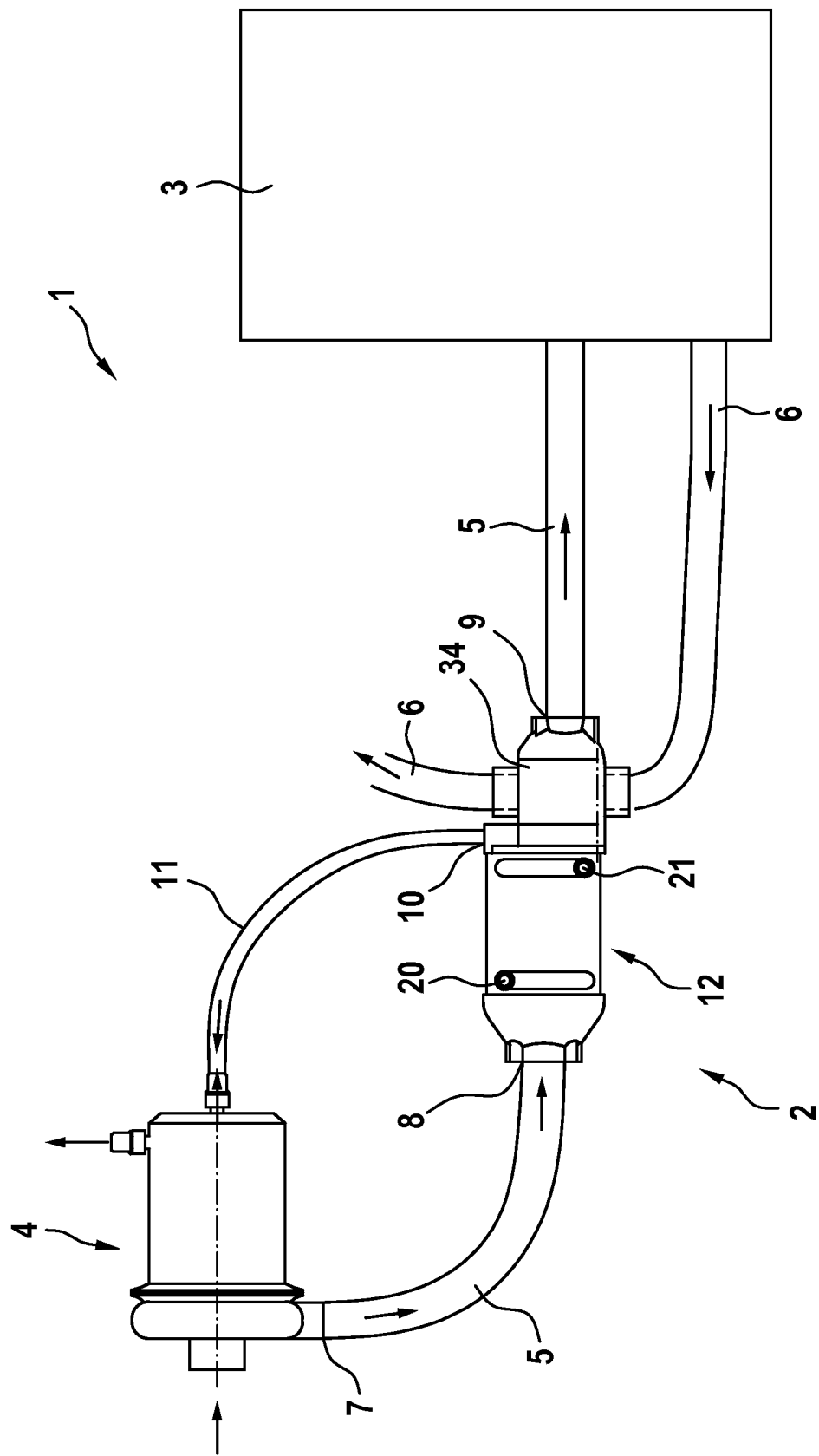
FIG. 4 shows the fuel cell system according to the invention having the heat exchanger according to the invention as per a third exemplary embodiment.

FIG. 4 shows the fuel cell system 1 as per the third exemplary embodiment. A membrane humidifier 34 is provided in the third exemplary embodiment.

The exhaust gas path 6 runs in this case through the membrane humidifier 34. Furthermore, the air path 5, downstream of the cooler matrix 17, likewise runs through the membrane humidifier 34. In the membrane humidifier 34, the air fed to the fuel cell 3 is humidified by means of the relatively humid exhaust gas.

In the third exemplary embodiment, the cooler matrix 17 is divided into two channels, specifically the fuel cell feed air channel 24 and the exhaust gas channel 33.

Figure 5:
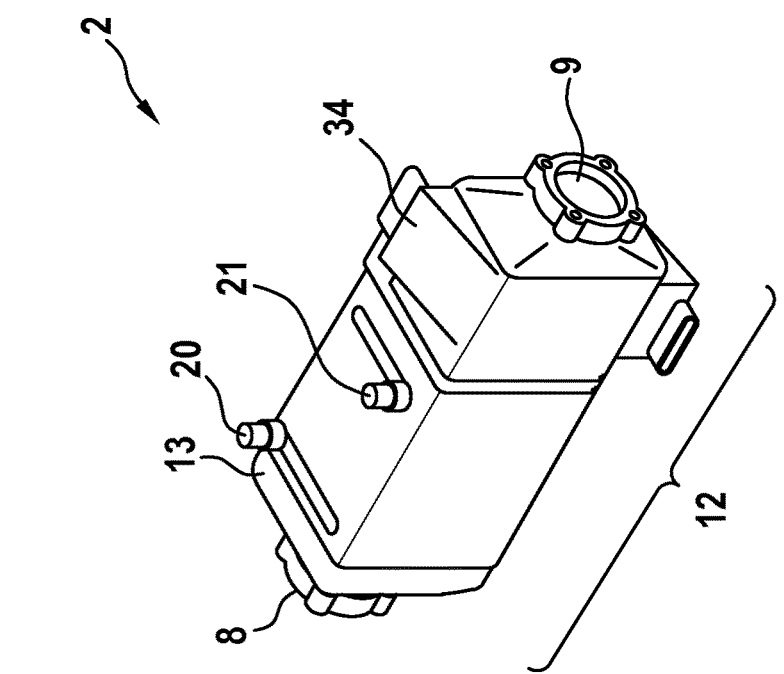
FIG. 5 shows two views of the heat exchanger according to the invention as per the third exemplary embodiment.
Figure 5:
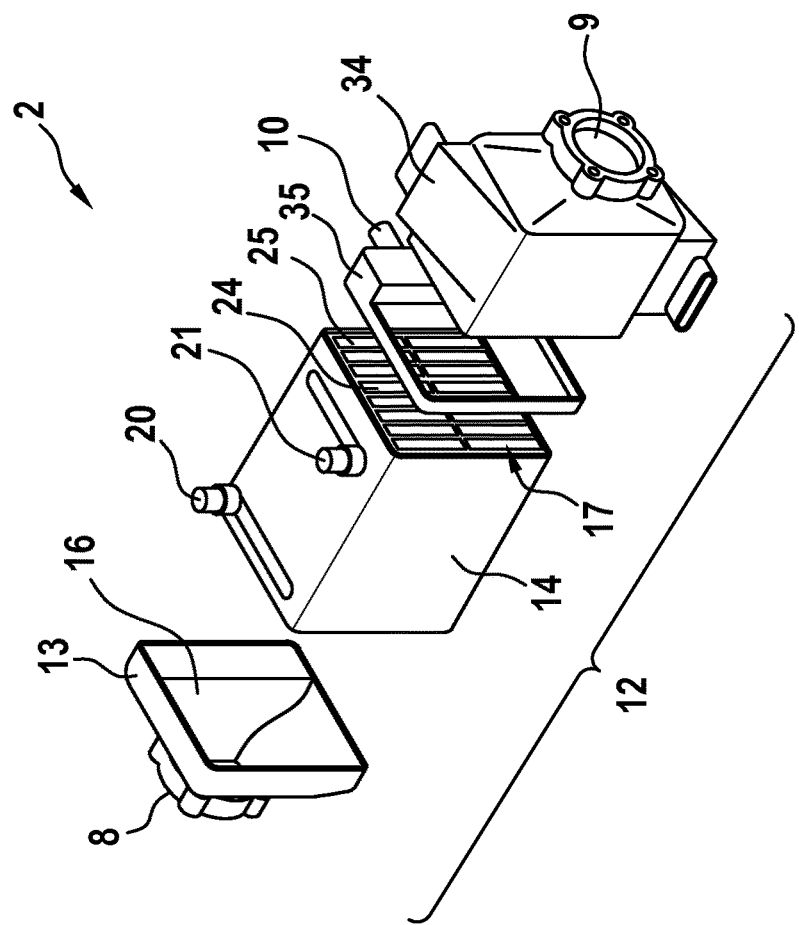

FIG. 5 shows the exact construction of the heat exchanger 2 of the third exemplary embodiment. In FIG. 5, the heat exchanger 2 is illustrated in an exploded view in the left-hand illustration. The right-hand illustration shows the assembled heat exchanger 2.

Instead of the end piece 15, the housing 12 comprises the membrane humidifier 34. The fuel cell air outlet 9 is formed at the right-hand end of the membrane humidifier 34. That side of the membrane humidifier 34 which faces toward the cooler matrix 17 extends over the entire cross-sectional area of the fuel cell air channel 24. In this way, the membrane humidifier 34 closes off the housing 12 or the central piece 14 on one side and can thus be used as an integral constituent part of the housing 12.

An intermediate piece 35 is inserted between the membrane humidifier 34 and the central piece 14. The intermediate piece 35 extends as a frame around the entire cross section of the cooler matrix 17. At the end of the compressor cooling air channel 25, the intermediate piece 35 forms a collecting chamber for conducting the air that is to be recirculated to the compressor 4 to the compressor cooling air outlet 10.

LIST OF REFERENCE CHARACTERS

1 Fuel cell system
2 Heat exchanger
3 Fuel cell
4 Compressor
5 Air path
6 Exhaust gas path
7 Compressor outlet
8 Air inlet (gas inlet)
9 Fuel cell air outlet (gas outlet)
10 Compressor cooling air outlet (gas outlet)
11 Compressor cooling air return line
12 Housing
13 Prechamber
14 Central piece
15 End piece
16 Guide element
17 Cooler matrix
18 Cooling elements
19 Cavities
20 Cooling fluid inlet
21 Cooling fluid outlet
22 Cooling fluid path
23 Partition
24 Fuel cell air channel
25 Compressor cooling air channel
26 Exhaust gas inlet (gas inlet)
27 Exhaust gas outlet (gas outlet)
28 Water separator
29 Water collecting vessel
30 Filter
31 Pump
32 Nozzle
33 Exhaust gas channel
34 Membrane humidifier
35 Intermediate piece The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system for a vehicle, comprising:
a fuel cell;
a compressor;
an air path from the compressor to a cathode side of the fuel cell; and
a heat exchanger disposed in the air path, wherein the heat exchanger includes a housing, a cooler matrix disposed in the housing, and a partition disposed in the cooler matrix;
wherein a fuel cell air channel is partitioned off in the cooler matrix by the partition and wherein air from the fuel cell air channel is suppliable to the cathode side of the fuel cell;
wherein a compressor cooling air channel is partitioned off in the cooler matrix by the partition and wherein air from the compressor cooling air channel is suppliable to the compressor.

2. The fuel cell system as claimed in claim 1, wherein:
a prechamber is formed in the housing upstream of the cooler matrix;
the fuel cell air channel is partitioned off from the compressor cooling air channel within the prechamber; and
a nozzle is disposed in the prechamber for injecting water into the fuel cell air channel.

3. The fuel cell system as claimed in claim 1 further comprising an exhaust gas path for exhaust gas from the fuel cell, wherein an exhaust gas channel through which the exhaust gas path runs is partitioned off in the cooler matrix.

4. The fuel cell system as claimed in claim 3, wherein water is separable off from the exhaust gas in or downstream of the exhaust gas channel.

5. The fuel cell system as claimed in claim 1 further comprising an exhaust gas path for exhaust gas from the fuel cell, wherein a membrane humidifier is integrated in the housing so as to join the fuel cell air channel and wherein the exhaust gas path runs through the membrane humidifier.

6. The fuel cell system as claimed in claim 1, wherein the partition extends through and/or across several cavities of the cooler matrix.

7. The fuel cell system as claimed in claim 1, wherein the fuel cell air channel and the compressor cooling air channel are separated from one another by the partition over an entire length.

* * * * *